United States Patent
Elliott

(10) Patent No.: US 7,603,137 B1
(45) Date of Patent: Oct. 13, 2009

(54) HYBRID COMMUNICATIONS LINK

(75) Inventor: Brig Barnum Elliott, Arlington, MA (US)

(73) Assignee: Verizon Corporate Services Group Inc. & BBN Technologies Corp., New York, NY (US)

( * ) Notice: Subject to any disclaimer, the term of this patent is extended or adjusted under 35 U.S.C. 154(b) by 501 days.

(21) Appl. No.: 11/044,397

(22) Filed: Jan. 27, 2005

(51) Int. Cl.
*H04L 12/56* (2006.01)

(52) U.S. Cl. .................. 455/552.1; 398/115

(58) Field of Classification Search ............ 455/74, 455/518, 524, 552.1, 553.1; 342/357.11, 342/357.14, 359; 398/115, 117
See application file for complete search history.

(56) References Cited

U.S. PATENT DOCUMENTS

| | | | |
|---|---|---|---|
| 6,763,195 B1 * | 7/2004 | Willebrand et al. ......... 398/115 |
| 6,816,112 B1 * | 11/2004 | Chethik ................. 342/357.14 |
| 2005/0243830 A1 * | 11/2005 | Wrenn et al. ............... 370/394 |
| 2005/0288031 A1 * | 12/2005 | Davis et al. .............. 455/452.1 |

OTHER PUBLICATIONS

Patrick Chisholm; "Lasercom Transformation"; Military Information Technology (On-Line Edition); vol. 7, Issue No. 5; Jul. 9, 2003; pp. 1-4.
U.S. Appl. No. 10/715,751; filed Nov. 17, 2003; entitled: "Systems and Methods for Implementing Contention-Based Optical Channel Access"; 36 pages.
U.S. Appl. No. 10/715,738; filed Nov. 17, 2003; entitled: Systems and Methods for Implementing Coordinated Optical Channel Access; 44 pages.
U.S. Appl. No. 10/716,270; filed Nov. 17, 2003; entitled: Optical AD-HOC Network; 46 pages.

* cited by examiner

*Primary Examiner*—Sam Bhattacharya

(57) ABSTRACT

A hybrid communications link includes a slow, reliable communications link and a fast unreliable communications link. Communication via the hybrid communications link selectively uses both the slow, reliable communications link and the fast, unreliable communications link.

32 Claims, 14 Drawing Sheets

FIG. 5

| PACKET SEQ. NO. | RETRY TIME | EXP. TIME | ACK'D |
|---|---|---|---|
| i-2 | 16:45:30 | 16:45:33 | NO |
| i-1 | 16:45:30 | 16:45:33 | NO |
| i | 16:45:30 | 16:45:33 | NO |
| i+1 | 16:45:30 | 16:45:33 | NO |
| i+2 | 16:45:30 | 16:45:33 | NO |
|  | 520 | 530 | 540 |

| PACKET SEQ. NO. | RECEIVED |
|---|---|
| j-3 | NO |
| j-2 | YES |
| j-1 | YES |
| j | YES |
| j+1 | NO |
|  | 620 |

610

328

HYBRID COMMUNICATIONS LINK

BACKGROUND INFORMATION

For some years, there has been extensive use of radio frequency (RF) channels to transport data packets, such as those used for communicating via the Internet (e.g., Internet Protocol (IP) packets). Such technologies have been used both in scenarios in which some or all of the nodes are stationary (e.g., to link a cellular base station to a regional center), as well as in scenarios in which some or all of the nodes are moving (e.g., for communication between aircraft). The simplest versions of these communications links employ omni-directional antennas because there is no need to correctly point such antennas in order to communicate. High performance versions, however, typically employ directional antennas because they provide higher quality (e.g., faster) communications links.

In recent years, there has been a growing interest in using optical (e.g., laser based) links instead of RF links. Laser beams are harder to correctly point than RF beams, however, because laser beams are typically much narrower than even highly directional RF beams. Once the laser beams are correctly pointed, however, they can provide much faster communications links than RF beams. For example, a freespace optical link might provide 10 Gigabits per second (10 Gbps) throughput, whereas an RF link of similar size and power might provide 500 Megabits per second (500 Mbps). Thus, in this example, the optical link is twenty times as fast as the RF link.

Optical links have significant drawbacks, however, even aside from the difficulty in accurately pointing them. First, they may experience momentary or prolonged outages due to obscurations in the atmosphere, such as dust, fog, clouds, or other particulates. Second, blooms of atmospheric turbulence may momentarily defocus or bend the beam so that it does not reach the receiver at sufficient power for correct reception. Third, when used on moving platforms (e.g., aircraft or spacecraft), the platform motion itself may induce short outages, such as when an airplane banks and a wing comes between the transmitter and receiver or when a spacecraft does not quite properly compensate for its own vibrations and hence mispoints its beam for a short while.

BRIEF DESCRIPTION OF THE DRAWINGS

FIG. 5 is an exemplary block diagram of a portion of the outbound database of the link memory of FIG. 3 according to an implementation consistent with the principles of the invention;

FIG. 6 is an exemplary block diagram of a portion of the inbound database of the link memory of FIG. 3 according to an implementation consistent with the principles of the invention;

DETAILED DESCRIPTION OF PREFERRED EMBODIMENTS

The following detailed description of preferred embodiments according to the invention refers to the accompanying drawings. The same reference numbers in different drawings may identify the same or similar elements.

Systems and methods consistent with the principles of the invention provide a hybrid link that pairs up a slower, but more reliable communications link (e.g., an RF link) with a faster, but less reliable communications link (e.g., a free space optical link) to achieve better performance than either of the links alone (where "fast" and "slow" and "more reliable" and "less reliable" are measured relative to the links—in other words, one link is faster than the other and one is more reliable than the other). Communication over the hybrid link may include selectively sending data on the slower, more reliable link and selectively sending data on the faster, less reliable link. In some instances, communication over the hybrid link may include sending data over both the slower, more reliable link and the faster, less reliable link.

According to one aspect consistent with the principles of the invention, a method for communicating between first and second nodes is provided. The method may include selectively transmitting a data unit from the first node to the second node over a first link and selectively transmitting the data unit from the first node to the second node over a second link, where the first link is slower and more reliable than the second link.

According to another aspect, a hybrid communications link between two nodes is provided. The hybrid communications link may include a slow, reliable communications link and a fast, unreliable communications link. Communication between the two nodes may selectively use both the slow, reliable communications link and the fast, unreliable communications link.

According to a further aspect, a node in communication with another node is provided. The node includes a first transceiver to communicate over a slow, reliable link, a second transceiver to communicate over a faster, less reliable link relative to the slow, reliable link, and a link processor.

The link processor may determine whether a data unit can be transmitted over the slow, reliable link and transmit the data unit over the slow, reliable link via the first transceiver when the data unit can be transmitted over the slow, reliable link. The link processor may also determine whether the data unit can be transmitted over the faster, less reliable link and transmit the data unit over the faster, less reliable link via the second transceiver when the data unit can be transmitted over the faster, less reliable link.

Figure 1:
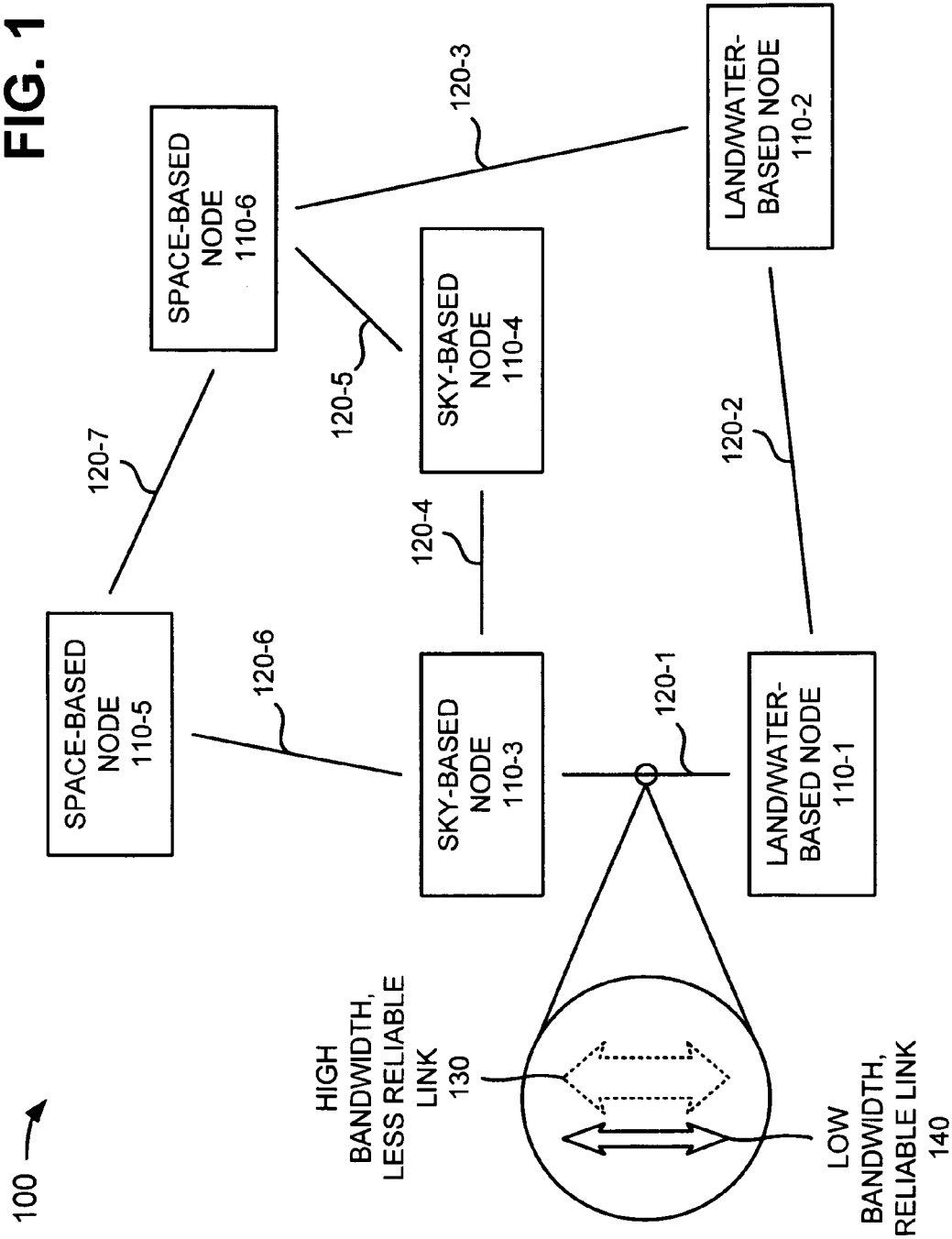
FIG. 1 is a block diagram of an exemplary network in which systems and methods consistent with the principles of the invention may be implemented.

FIG. 1 is a block diagram of an exemplary network 100 in which systems and methods consistent with the principles of the invention may be implemented. Network 100 may include nodes 110-1 through 110-6 (collectively referred to as "nodes 110") that communicate with one another via links 120-1 through 120-7 (collectively referred to as "links 120"). While FIG. 1 shows that network 100 includes six nodes and seven links, a typical network 100 may include more or fewer of these nodes and/or links.

Nodes 110 may include different types of nodes, such as land/water-based nodes 110-1 and 110-2, sky-based nodes 110-3 and 110-4, and space-based nodes 110-5 and 110-6. Land/water-based nodes 110-1 and 110-2 might include any terrestrial or marine communication device capable of communicating with another land/water-based node and/or a sky-based or space-based node. Examples of land/water-based nodes 110-1 and 110-2 might include cellular base stations, ground stations, terminals, workstations, personal computers, cellular telephones, personal digital assistants, and waterborne platforms (e.g., ships, boats, and oil platforms).

Sky-based nodes 110-3 and 110-4 might include any communication device associated with an aircraft capable of communicating with another sky-based node and/or a space-based or land/water-based node. Examples of sky-based nodes 110-3 and 110-4 might include airplanes, helicopters, and blimps. Space-based nodes 110-5 and 110-6 might include any communication device associated with a spacecraft capable of communicating with another space-based node and/or a sky-based or land/water-based node. Examples of space-based nodes 110-5 and 110-6 might include satellites, spaceships (e.g., space shuttles), and space stations.

Nodes 110 communicate with one another via links 120. One or more of links 120 may include hybrid links consistent with the principles of the invention. As illustrated in FIG. 1, link 120-1 includes a hybrid link that is made up of a link 130 and a link 140. Link 130 may include a high bandwidth, less reliable (e.g., intermittent) link, such as an optical link. Link 140 may include a low bandwidth, more reliable link, such as an RF link.

Although there are many different reasons why an optical link (e.g., link 130) might momentarily degrade, or even degrade for significant periods of time, the optical link conveys information (e.g., packets) so much faster than an RF link (e.g., link 140) that it would be desirable to employ the optical link whenever possible, but still use the RF link essentially all of the time. In short, it would be desirable to harness the "bursts of brilliance" (i.e., periods in which enormous amounts of data can be delivered very quickly) that an optical link might provide in order to send as many packets as possible during its intervals of connectivity, but to also employ an RF link in order to keep up a slower, but more reliable, link for times when the optical link is disrupted.

A hybrid link, consistent with the principles of the invention, may take advantage of optical links that "flicker" in and out of service at fairly fast rates. For example, the hybrid link may allow use of optical links that have deep fades (i.e., momentary outages) of fifty milliseconds or less. The hybrid link would also be beneficial, however, with optical links that have longer outages (e.g., minutes at a time).

While links 130 and 140 have been described as optical and RF links, respectively, this need not be the case. For example, one or more of links 130 and 140 may include an acoustic link or a magnetic link. Alternatively, links 130 and 140 may include different varieties of RF links or optical links. While FIG. 1 shows that link 120-1 includes a single link 130 and a single link 140, link 120-1 may alternatively include multiple links 130 and/or links 140 in other implementations consistent with the principles of the invention.

Figure 2:
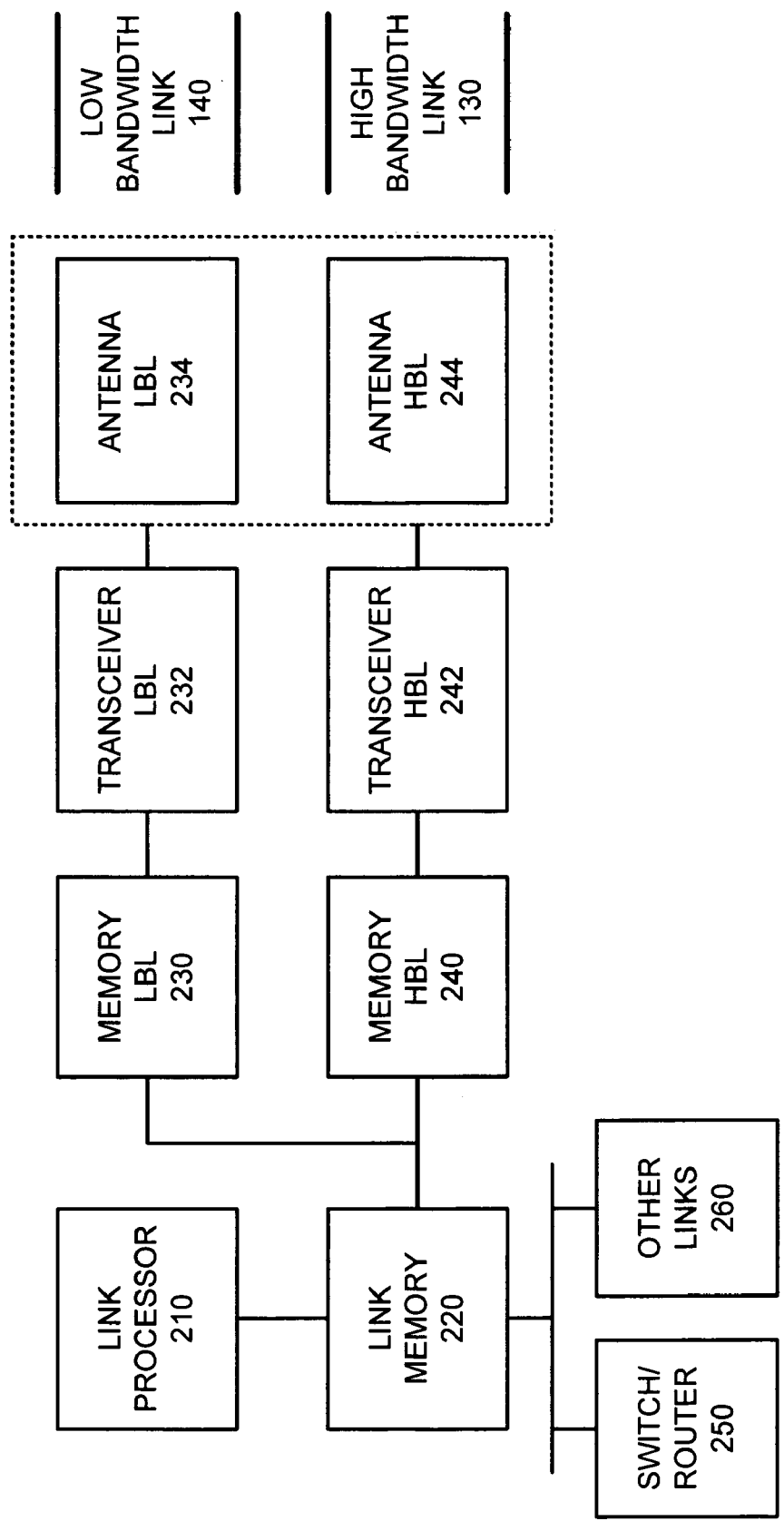
FIG. 2 is an exemplary block diagram of a node of FIG. 1 according to an implementation consistent with the principles of the invention.

FIG. 2 is an exemplary block diagram of a node 110-$x$ (where node 110-$x$ refers to one of nodes 110 in FIG. 1) according to an implementation consistent with the principles of the invention. Node 110-$x$ may include link processor 210, link memory 220, low bandwidth link memory (memory LBL) 230, transceiver LBL 232, antenna LBL 234, high bandwidth link memory (memory HBL) 240, transceiver HBL 242, and antenna HBL 244. Node 110-$x$ may optionally also include switch/router 250 and other links 260. In other implementations, node 110-$x$ may include more, fewer, or different components.

Link processor 210 may include a general purpose or specialized processor that is designed to support communication over one or more communications links, such as links 130 and 140. For example, link processor 210 may include a central processing unit, a microprocessor, a microcontroller, a digital signal processor, a field programmable gate array, an application specific integrated circuit, or any combination of these. Link processor 210 may also include its own local memory that stores programs and working data. Link processor 210 may perform certain communication-related processing in addition to any other services that may be useful for communication over a link, such as link management and troubleshooting, control for pointing and tracking, etc.

Link memory 220 may include working storage (e.g., DRAM) that may be accessible via several buses or internal networks so that it can exchange data with switch/router 250, other links 260, link processor 210, memory LBL 230, and memory HBL 240. Link memory 220 may buffer packets to be transmitted on a link, packets received across a link, as well as other useful data, such as statistics regarding packet transmissions.

Memory LBL 230 may buffer packets and other convenient data associated with a low bandwidth link, such as link 140 (FIG. 1). Memory LBL 230 may buffer both "outbound" packets for transmission through transceiver LBL 232 and "inbound" packets that have recently been received via transceiver LBL 232. Similarly, memory HBL 240 may buffer packets and other convenient data associated with a high bandwidth link, such as link 130 (FIG. 1). Memory HBL 240 may buffer both "outbound" packets for transmission through transceiver HBL 242 and "inbound" packets that have recently been received via transceiver HBL 242. Memory LBL 230 and memory HBL 240 may also store control information, as will be described in further detail below. Memories 230 and 240 may be of different sizes and operate at different speeds. For example, memory HBL 240, which is associated with high bandwidth link 130, may have a much larger capacity for its working storage and operate at a faster speed than memory LBL 230, which is associated with low bandwidth link 140.

Transceiver LBL 232 may include a conventional transceiver, such as a microwave RF transmitter/receiver and its associated modem. Transceiver HBL 242 may include a conventional transceiver, such as a freespace optical transmitter (e.g., a laser and modulator), receiver (e.g., a detector, such as an avalanche photodiode), and modem. Transceiver LBL 232 and transceiver HBL 242 may control transmission and reception of packets (and possibly other information) via antenna LBL 234 and antenna HBL 244, respectively.

Antenna LBL 234 and antenna HBL 244 are associated with transceiver LBL 232 and transceiver HBL 242, respectively. In one exemplary implementation, antenna LBL 234 may include a small dish antenna suitable for use with microwaves and antenna HBL 244 may include a telescope suitable for use with freespace optics. Antenna LBL 234 and antenna HBL 244 may be enclosed in an optional common housing (as shown by the dotted line in FIG. 2) to provide, for example, a single mechanism for pointing both antennas 234 and 244 toward a distant node. Alternatively, antenna LBL 234 might include an electronically steerable phased array while antenna HBL 244 might include a small mirror to steer its light beam.

Optional switch/router 250 may include one or more mechanisms that may be used to forward or route packets, or other information, to or from node 110-*x*. Optional other links 260 may include links that facilitate the transmission and reception of packets, or other information, to or from node 110-*x*.

The main data paths within node 110-*x* may be implemented via buses, backplanes, internal networks, such as Ethernet or fiber links, or any other convenient mechanisms. While control paths are not explicitly shown in FIG. 2, it should be understood that node 110-*x* may include paths via which link processor 210 can send commands to memories 230 and 240, transceivers 232 and 242, antennas 234 and 244, etc. in order to poll their status, provide commands (e.g., for setting the amount of forward error correction or steering an antenna), and the like.

Figure 3:
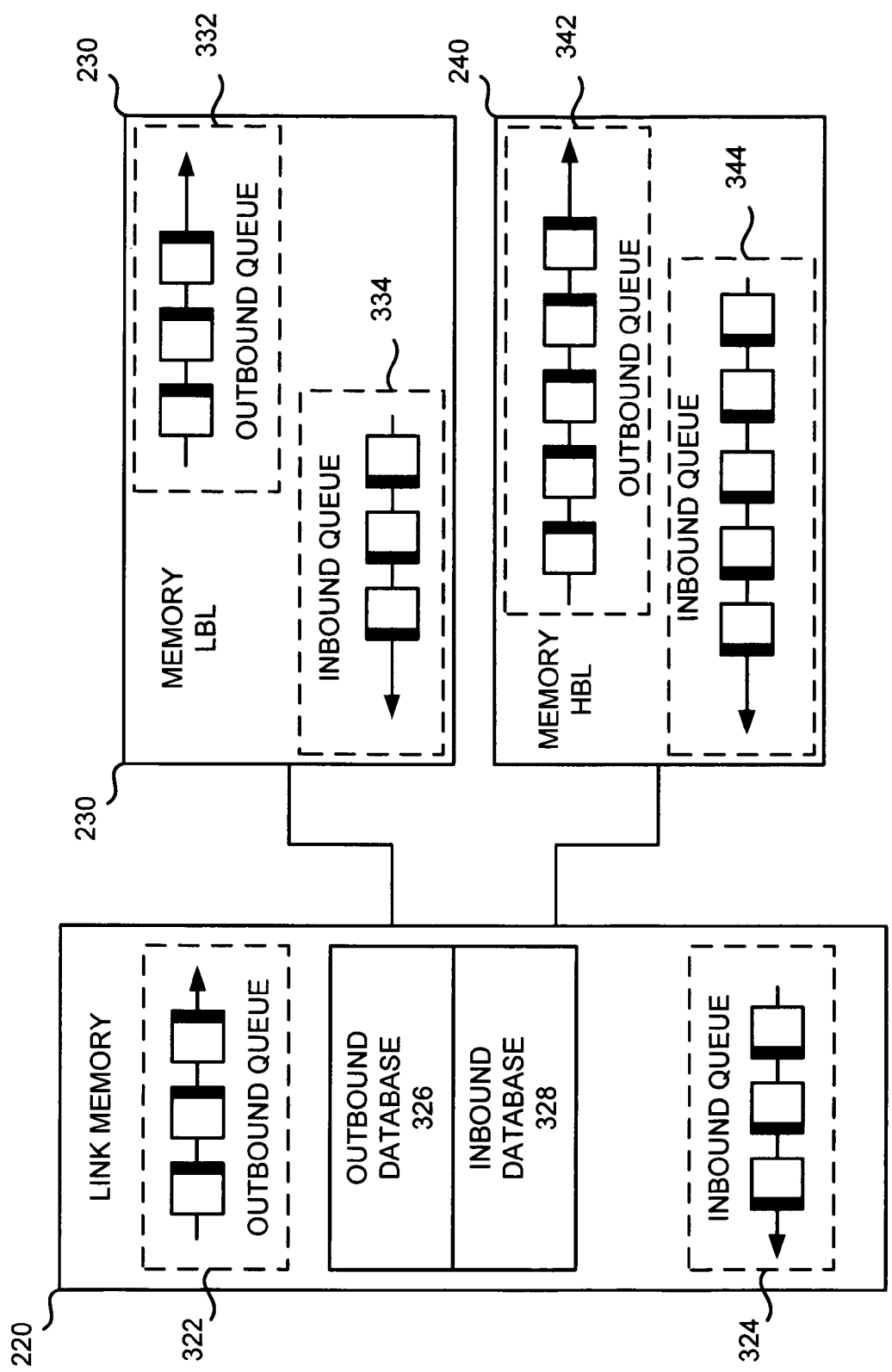
FIG. 3 is an exemplary block diagram of a portion of the link memory, the low bandwidth link memory ("memory LBL"), and the high bandwidth link memory ("memory HBL") of FIG. 2 according to an implementation consistent with the principles of the invention.

FIG. 3 is an exemplary diagram of a portion of link memory 220, memory LBL 230, and memory HBL 240 according to an implementation consistent with the principles of the invention. Link memory 220 may include outbound queue 322, inbound queue 324, outbound database 326, and inbound database 328. Outbound queue 322 may buffer packets (and possibly other information) for transmission via one or more of antenna LBL 234 and antenna HBL 244. Inbound queue 324 may buffer packets (and possibly other information) that was received via one or more of antenna LBL 234 and antenna HBL 244. Inbound queue 324 may output packets for use by link processor 210, switch/router 250, and/or other links 260. Queues 322 and 324 may take the form of a linked list or may take other forms.

While a single outbound queue 322 and a single inbound queue 324 are shown in FIG. 3, in practice there may be more outbound queues and/or inbound queues. For example, packets transmitted or received by node 110-*x* may have different associated classes or priorities or be associated with different traffic flows or qualities of service. In this case, link memory 220 may include multiple outbound and/or inbound queues (e.g., one for each distinct packet class, packet priority, traffic flow, or quality of service).

Figure 4:
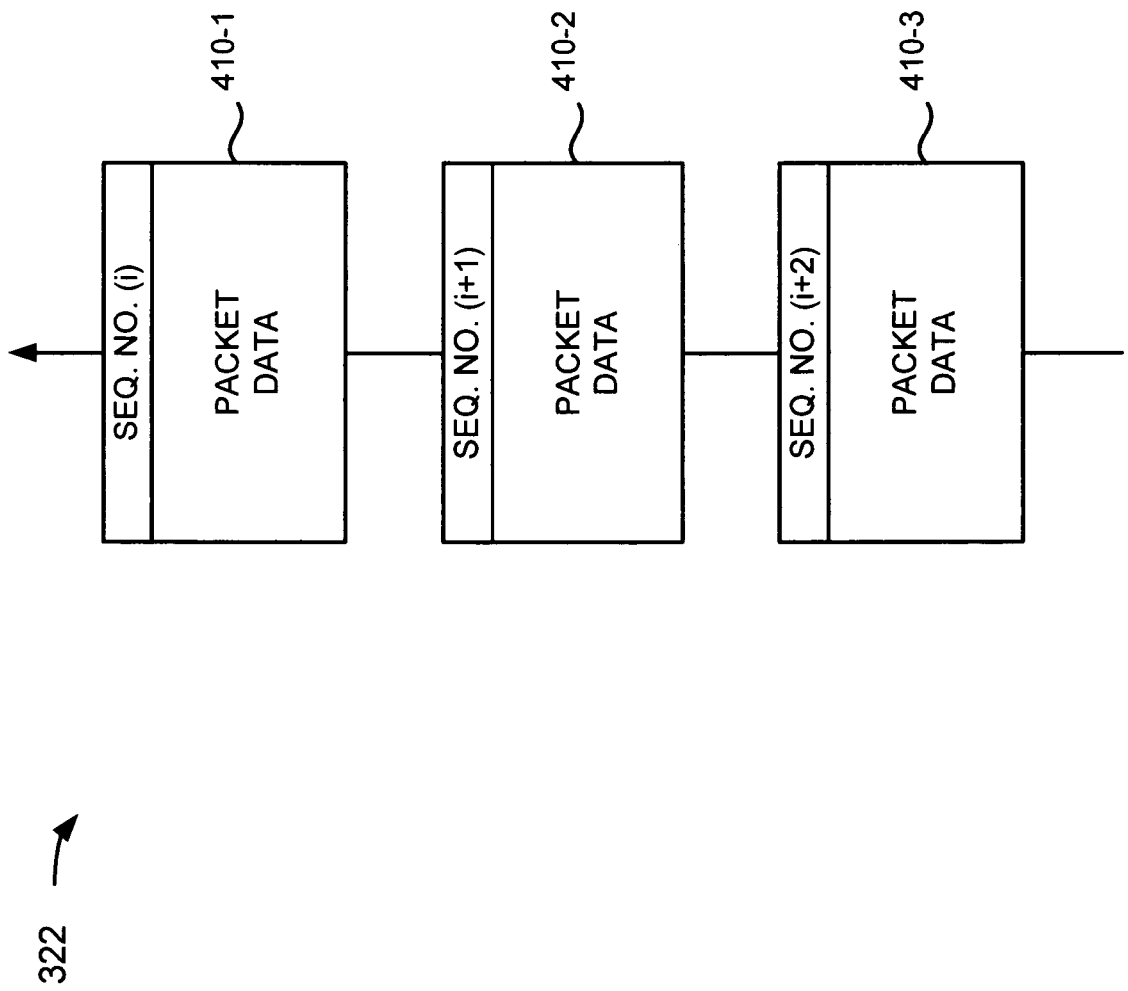
FIG. 4 is an exemplary block diagram of the outbound queue of the link memory of FIG. 3 according to an implementation consistent with the principles of the invention.

FIG. 4 is an exemplary diagram of a portion of outbound queue 322 according to an implementation consistent with the principles of the invention. Inbound queue 324 may be similarly configured. In the exemplary implementation shown in FIG. 4, outbound queue 322 takes the form of a linked list. In other implementations, outbound queue 322 may take different forms.

Outbound queue 322 may include a number of buffers 410-1 through 410-3 (collectively referred to as "buffers 410"). Each of buffers 410 may store packet data and a sequence number. The sequence number may be assigned by link processor 210 to each outbound packet to uniquely identify the packet. The sequence number may be of finite size (e.g., 32 bits) and may "wrap around" back to zero when the highest possible number has been used.

Returning to FIG. 3, outbound database 326 may store information regarding packets to be transmitted via one or more of antenna LBL 234 and antenna HBL 244. FIG. 5 is an exemplary diagram of a portion of outbound database 326 according to an implementation consistent with the principles of the invention. Outbound database 326 may include an entry for each packet (or some of the packets) stored by outbound queue 322. Each entry may include a number of fields, such as packet sequence number (SEQ. NO.) field 510, an optional retry time field 520, an optional expiration (EXP.) time field 530, and an acknowledged (ACK'D) field 540. Packet sequence number field 510 may store the sequence number (i) assigned to the packet. Optional retry time field 520 may store a time value at which a packet may be retransmitted. This field typically stores values for packets that have not yet been acknowledged as being properly received at its destination. Optional expiration time field 530 may store a time value after which the packet may be considered worthless and may be discarded. Acknowledged field 540 may store a value that indicates whether an acknowledgement has been received, indicating that the packet has been properly received at its destination.

Returning to FIG. 3, inbound database 328 may store information regarding packets properly received via one or more of antenna LBL 234 and antenna HBL 244. FIG. 6 is an exemplary diagram of a portion of inbound database 328 according to an implementation consistent with the principles of the invention. Inbound database 328 may include an entry for each packet (or some of the packets) stored by inbound queue 324. Inbound database 328 makes no distinction for the particular one of antenna LBL 234 and/or antenna HBL 244 via which a packet is received. In fact a particular packet may be correctly received multiple times (e.g., once via each antenna 234/244 or as a result of repeated transmissions).

Each entry in inbound database 328 may include a number of fields, such as packet sequence number (SEQ. NO.) field 610 and a received field 620. Packet sequence number field 610 may store the sequence number (j) assigned to the packet by the sending node. Received field 620 may store a value that indicates whether the packet was properly received.

Returning to FIG. 3, memory LBL 230 and memory HBL 240 may include outbound queues 332 and 342 and inbound queues 334 and 344, respectively. Outbound queues 332 and 342 may buffer packets (and possibly other information) for transmission via a respective one of antenna LBL 234 and antenna HBL 244. Inbound queues 334 and 344 may buffer packets (and possibly other information) that was received via a respective one of antenna LBL 234 and antenna HBL 244. Queues 332, 334, 342, 344 may take the form of a linked list or may take other forms.

While FIG. 3 shows a single outbound queue 332/342 and a single inbound queue 334/344 associated with each of memory LBL 230 and memory HBL 240, in practice there may be more outbound queues and/or inbound queues. For example, memory LBL 230 and/or memory HBL 240 may include multiple outbound and/or inbound queues (e.g., one for each distinct packet class, packet priority, traffic flow, or quality of service). Also, the size of outbound queues 332/342 and/or inbound queues 334/344 may differ for memory LBL 230 and memory HBL 342 due to their possibly differing operating speeds. Further, one or more of outbound queues 332/342 and inbound queues 334/344 may have associated high and/or low thresholds (or watermarks) that may be used to determine how full or empty the queues are.

Figure 7A:
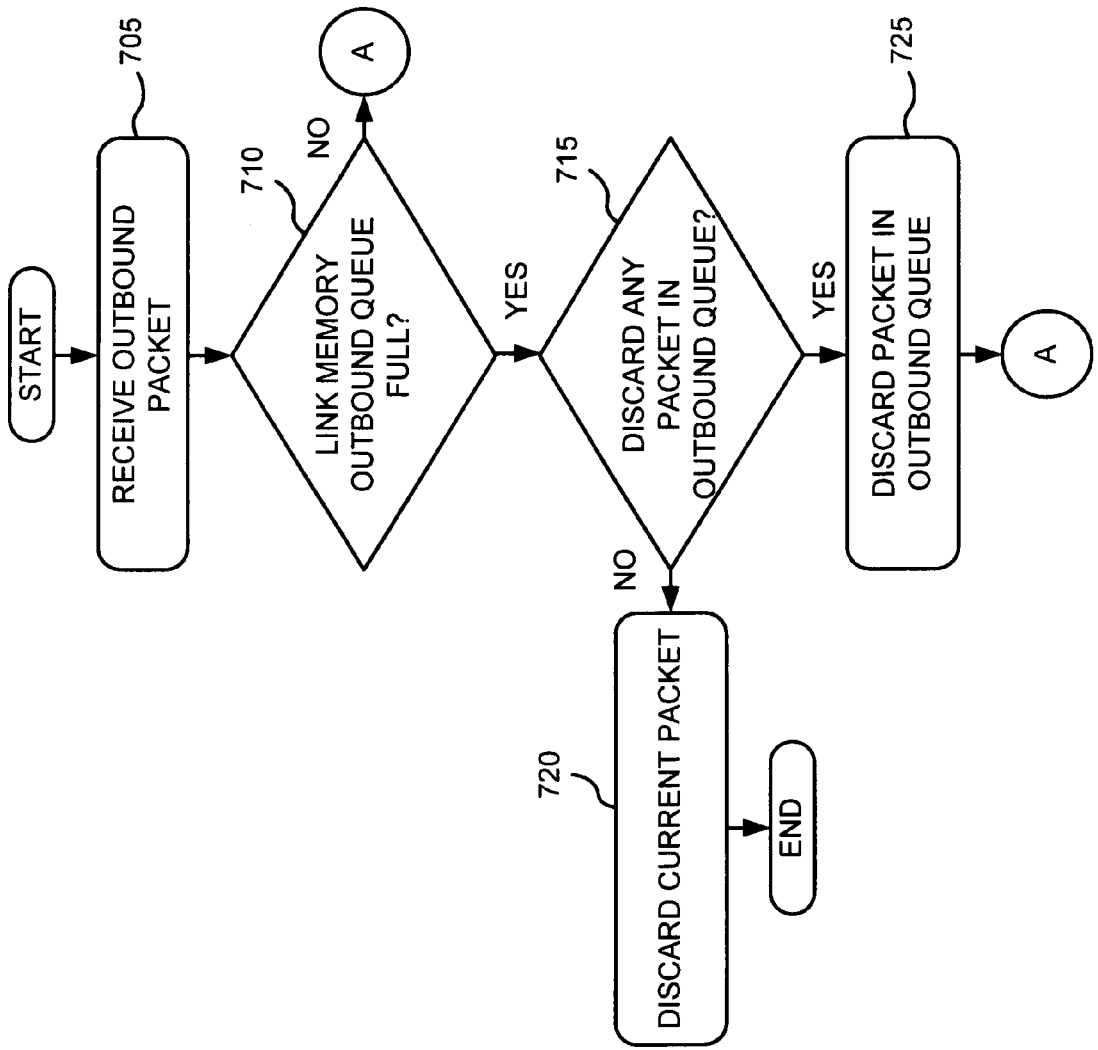
FIGS. 7A-7C are flowcharts of exemplary processing for transmitting an outbound packet according to an implementation consistent with the principles of the invention.
Figure 7B:
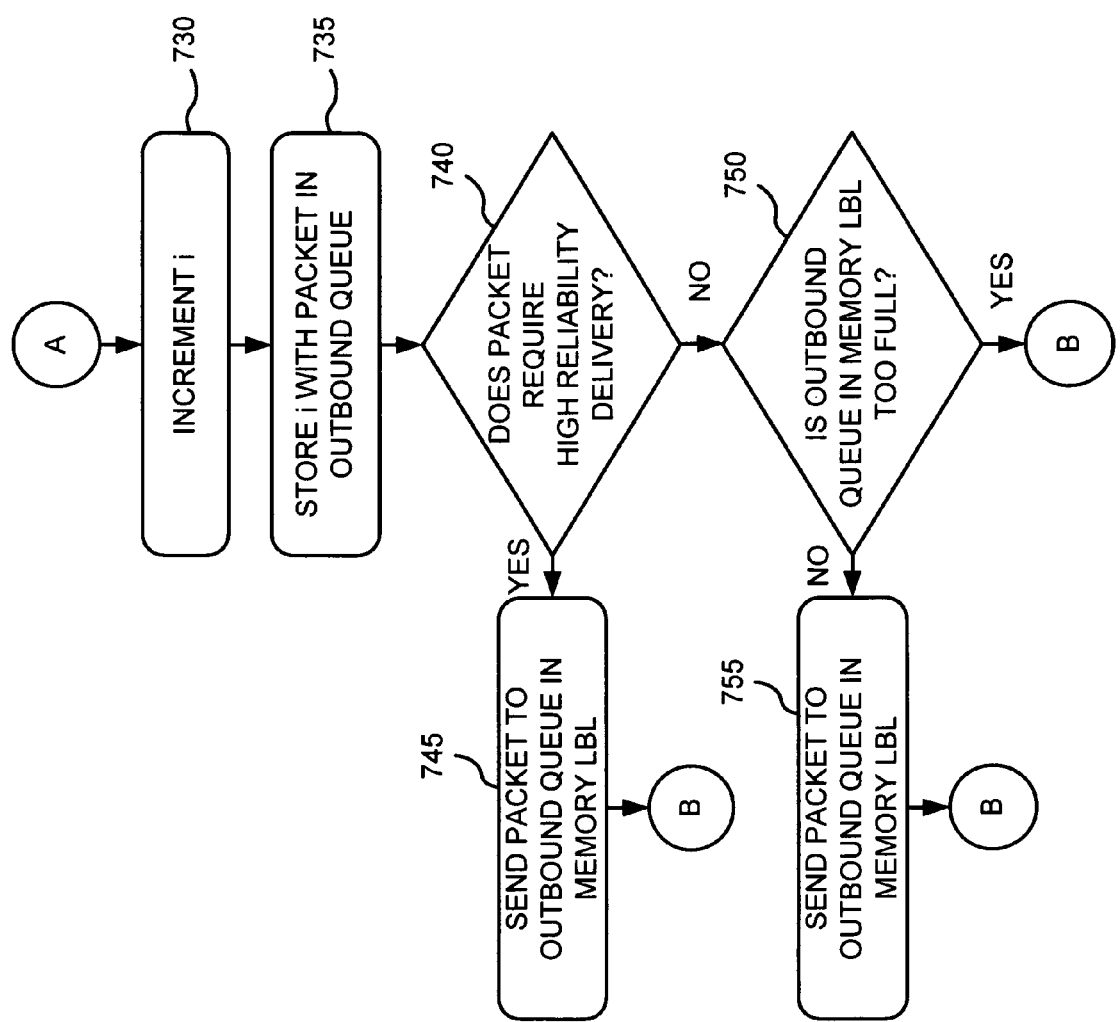
Figure 7C:
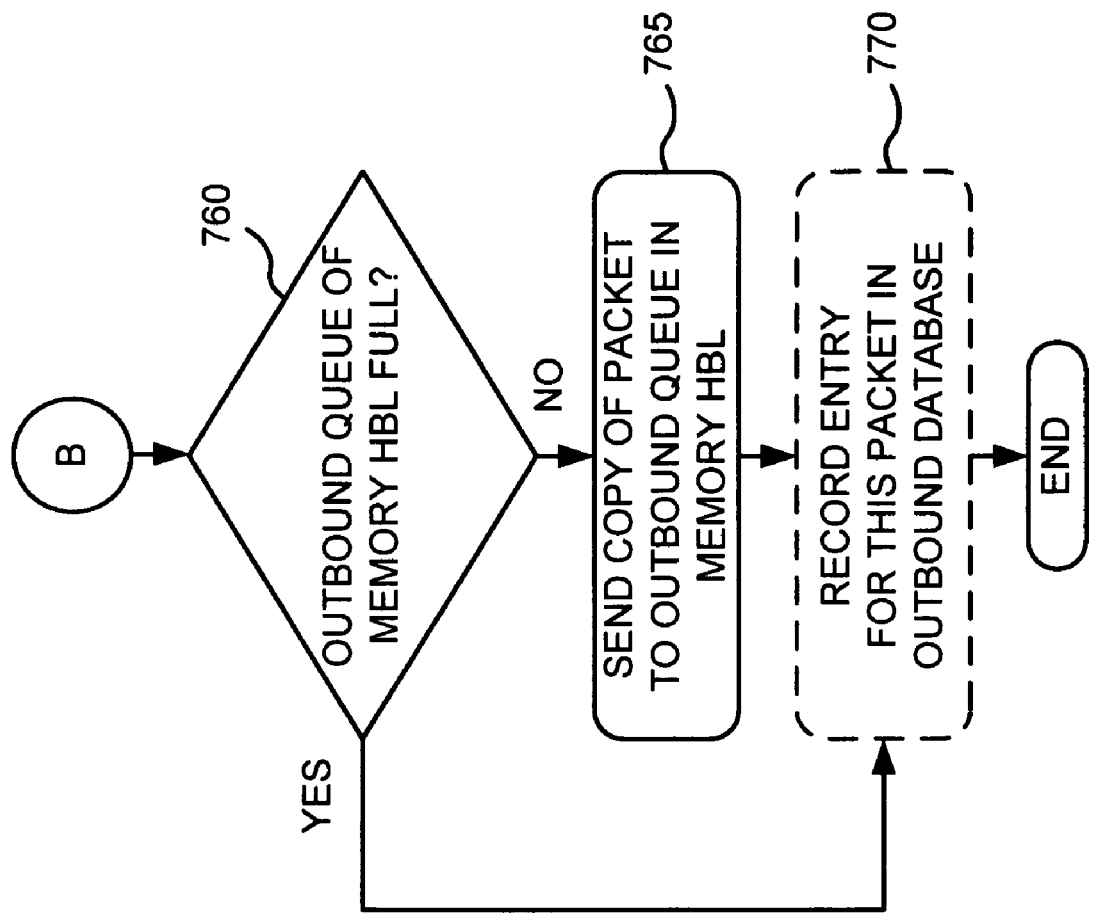

FIGS. 7A-7C are flowcharts of exemplary processing for transmitting an outbound packet according to an implementation consistent with the principles of the invention. Processing may begin with receipt of an outbound packet ("current packet") by link processor 210 (act 705) (FIG. 7A). Link processor 210 may receive the current packet from switch/router 250, other links 260, or other sources. Link processor 210 may then determine whether outbound queue 322 within link memory 220 is full (act 710). Link processor 210 may make this determination by simply examining outbound queue 322 itself or by asking link memory 220.

If outbound queue 322 is full, link processor 210 may determine whether any of the packets stored in outbound queue 322 may be discarded (act 715). For example, link processor 210 may determine whether outbound queue 322 stores any packets that are lower in priority than the current packet. Alternatively, link processor 210 may use other information associated with the packets in outbound queue 322, such as their expiration times, when determining whether to discard one of them. If link processor 210 determines that no packets should be discarded from outbound queue 322, then link processor 210 may discard the current packet (act 720). Link processor 210 may then end processing regarding the current packet.

If link processor 210 determines that a packet should be discarded from outbound queue 322, then link processor 210 may discard that packet (act 725). When link processor 210 determines that outbound queue 322 is not full (act 710) or discards a packet in outbound queue 322 to make room for the current packet (act 725), link processor 210 may increment the current sequence number (i) to create a new sequence number (e.g., i=i+1) for the current packet (act 730) (FIG. 7B). Link processor 210 may then store the current packet and its sequence number (i) in outbound queue 322 (act 735).

Link processor 210 may then determine whether the current packet requires high reliability delivery (act 740). A packet may require high reliability delivery when it has a high priority, requires a certain (high) quality of service, or is associated with a communication that is sensitive to dropped packets, such as a voice communication. If the current packet requires high reliability delivery, then link processor 210 may send a copy of the current packet to outbound queue 332 of memory LBL 230 (act 745).

If the current packet does not require high reliability delivery, link processor 210 may determine whether outbound queue 332 in memory LBL 230 is too full (act 750). For example, link processor 210 may determine whether the number of packets stored by outbound queue 332 exceeds a high threshold (or watermark). If outbound queue 332 is not too full, then link processor 210 may send a copy of the current packet for storage in outbound queue 332 (act 755).

If the current packet has been stored in outbound queue 332 (act 745 or 755) or outbound queue 332 is too full (act 750), then link processor 210 may determine whether outbound queue 342 in memory HBL 240 is too full (act 760) (FIG. 7C). For example, link processor 210 may determine whether the number of packets stored by outbound queue 342 exceeds a high threshold (or watermark). If outbound queue 342 is not too full, then link processor 210 may send a copy of the current packet for storage in outbound queue 342 (act 755).

As an optional additional act, link processor 210 may record an entry for the current packet in outbound database 326 (act 770). Link processor 210 may do this for all packets or just those packets that it determines are sufficiently important (e.g., packets with high priorities or packets associated with a certain traffic flow or quality of service). As shown in FIG. 5, link processor 120 may store the current packet's sequence number in packet sequence number field 510 and set the value stored in acknowledged field 540 to indicate that no acknowledgement has yet been received (e.g., NO). Optionally, link processor 120 may also store a retry time in retry time field 520 and an expiration time in expiration time field 530.

Figure 8:
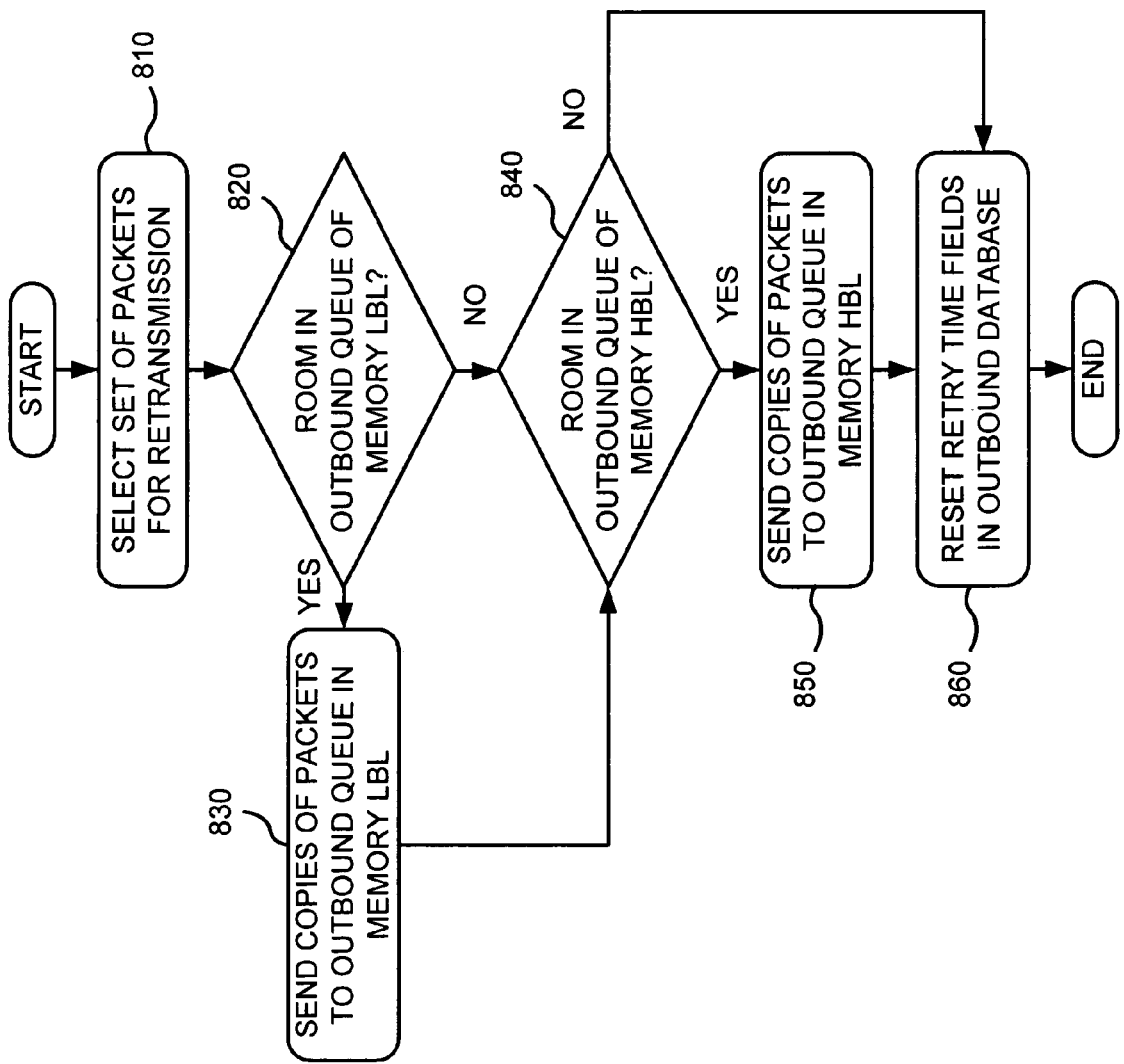
FIG. 8 is a flowchart of exemplary processing for retrying transmission of outbound packets according to an implementation consistent with the principles of the invention.

FIG. 8 is a flowchart of exemplary processing for retrying transmission of outbound packets according to an implementation consistent with the principles of the invention. The processing described below may be performed periodically (e.g., once every 100 milliseconds), on an event-driven basis (e.g., when the number of packets in outbound queue 342 drops below a low threshold), or at any other convenient time.

Processing may begin with link processor 210 selecting a set of packets for retransmission (act 810). For example, link processor 210 may analyze retry time field 520 (FIG. 5) in outbound database 326 to determine which packets are ready for retransmission. Any packets that have a corresponding retry time in retry time field 520 earlier than the current time are candidates for retransmission. Link processor 210 may select all or some of the candidate packets for retransmission. For example, link processor 210 may select packets with the lowest sequence numbers (i.e., the oldest packets), the more important packets, or any other set of packets.

Link processor 210 may then determine whether there is sufficient room in outbound queue 332 of memory LBL 230 for storage of the set of packets (act 820). Link processor 210 may make this determination by analyzing outbound queue 332 itself or by asking memory LBL 230. If there is sufficient room in outbound queue 332, then link processor 210 may send copies of the packets for storage in outbound queue 332 (act 830). If there is insufficient room in outbound queue 332 to store all of the packets, then link processor 210 may optionally store some of them and optionally retry the others at a later time (not shown in flowchart).

Regardless of whether copies of the packets have been stored in outbound queue 332 (acts 820 and 830), link processor 210 may determine whether there is sufficient room in outbound queue 342 of memory HBL 240 for storage of the set of packets (act 840). Link processor 210 may make this determination by analyzing outbound queue 342 itself or by asking memory HBL 240. If there is sufficient room in outbound queue 342, then link processor 210 may send copies of the packets for storage in outbound queue 342 (act 850). If there is insufficient room in outbound queue 342 to store all of the packets, then link processor 210 may optionally store some of them and optionally retry the others at a later time (not shown in flowchart). Link processor 120 may reset retry time fields 520 (FIG. 5) corresponding to the packets in outbound database 326 (act 860). As a result, link processor 120 may attempt retransmission of these packets at a later time if they still have not been successfully received by that time.

Figure 9:
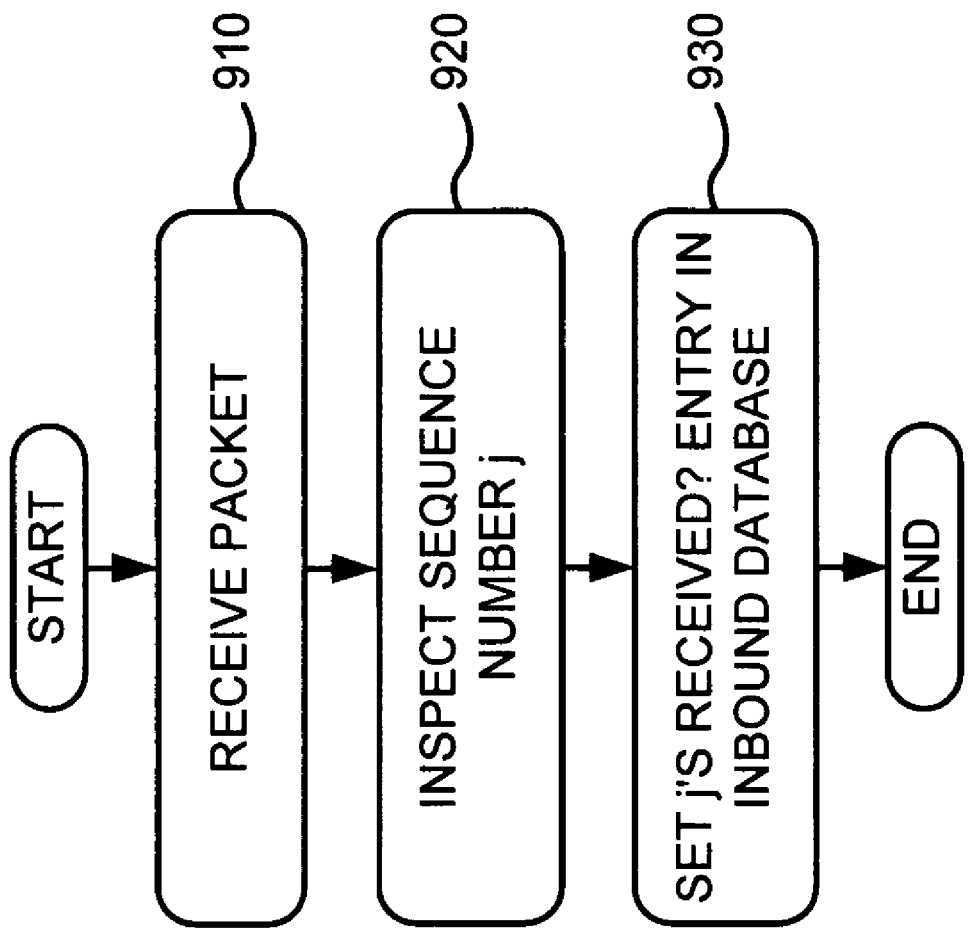
FIG. 9 is a flowchart of exemplary processing for receiving an inbound packet according to an implementation consistent with the principles of the invention.

FIG. 9 is a flowchart of exemplary processing for receiving an inbound packet according to an implementation consistent with the principles of the invention. Processing may begin with link processor 210 successfully receiving a packet via one or more of antenna LBL 234 and antenna HBL 244 (act 910). Link processor 210 may inspect the sequence number (j) associated with the packet (act 920). The sequence number may be assigned by the sending node and transmitted along with the packet. Link processor 210 may then set the value in received field 620 (FIG. 6) corresponding to the sequence number (j) in inbound database 328 to indicate that the packet was successfully received (e.g., YES) (act 930).

Figure 10:
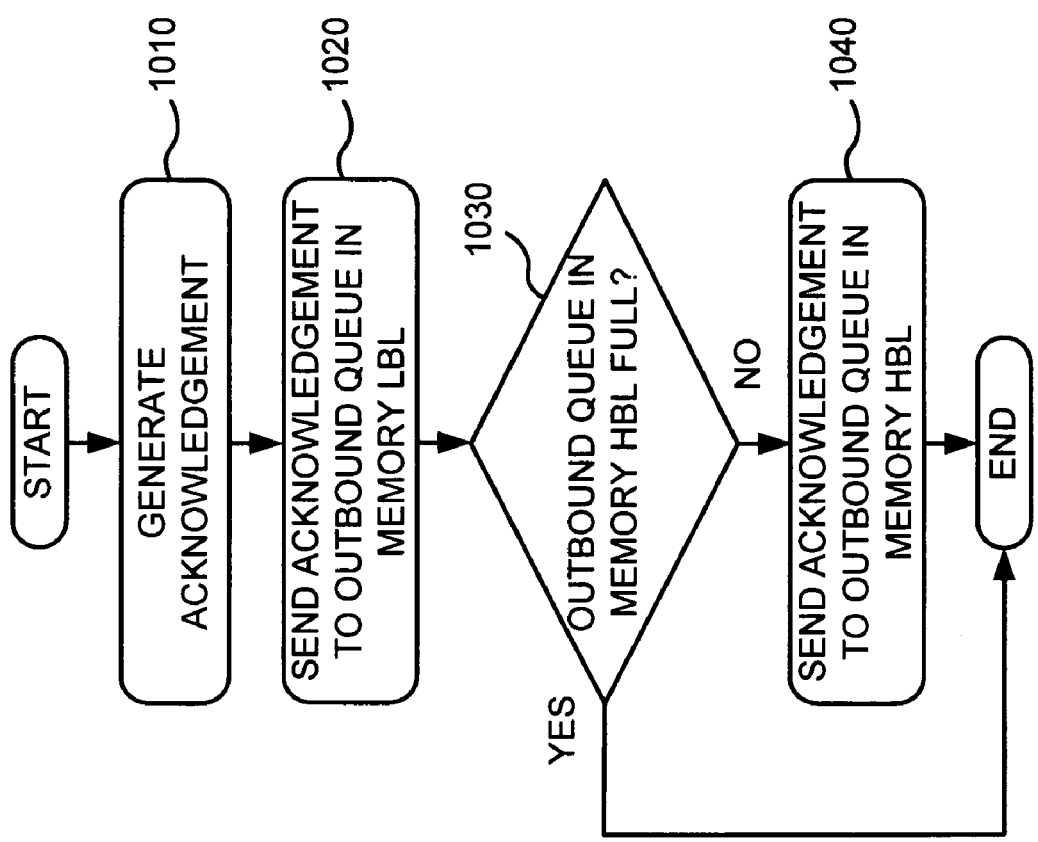
FIG. 10 is a flowchart of exemplary processing for transmitting an acknowledgement message according to an implementation consistent with the principles of the invention.

FIG. 10 is a flowchart of exemplary processing for transmitting an acknowledgement message according to an implementation consistent with the principles of the invention. The processing described below may be performed periodically or whenever some event occurs (e.g., when a few thousand packets have been correctly received).

Figure 11:
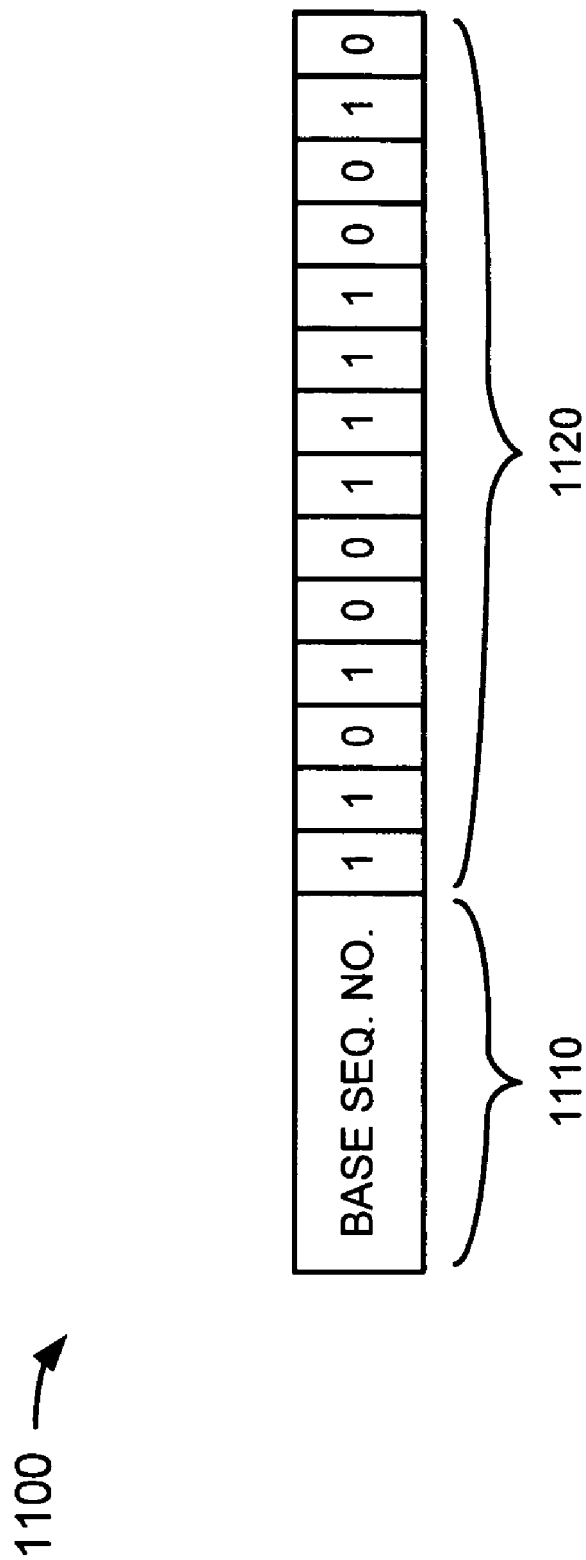
FIG. 11 is an exemplary diagram of an acknowledgement message according to an implementation consistent with the principles of the invention.

Processing may begin with link processor 210 generating an acknowledgement message (act 1010). FIG. 11 is an exemplary diagram of an acknowledgement message 1100 according to an implementation consistent with the principles of the invention. Acknowledgement message 1100 may include a base sequence number (BASE SEQ. NO.) 1110 and a number of bit fields 1120. Base sequence number 1110 may be set to some value of j (e.g., 1,000). Bit fields 1120 may indicate whether packet j was correctly received, as well as packets subsequent to packet j (e.g., packet j+1, packet j+2, etc.). The values stored in bit fields 1120 may be taken from received field 620 (FIG. 6) of inbound database 328.

This acknowledgement scheme uses simple encoding where one bit is used for each sequence number (e.g., a "1" may mean that the corresponding packet was correctly received and a "0" may mean that the packet was not correctly received). Other schemes could alternatively be used. For example, the acknowledgement message may be generated to include explicit lists of sequence numbers, run-length encoding, compression techniques, etc.

Returning to FIG. 10, link processor 210 may send the acknowledgement message for storage in outbound queue 332 of memory LBL 230 (act 1020). Link processor 210 may primarily transmit acknowledgement messages via outbound queue 332 because it is associated with a reliable communication link (i.e., link 140). Link processor 210 may also determine whether outbound queue 342 of memory HBL 240 is full (i.e., contains no room to store the acknowledgement message) (act 1030). If outbound queue 342 is not full, then link processor 210 may send a copy of the acknowledgement message for storage in outbound queue 342 (act 1040).

Figure 12:
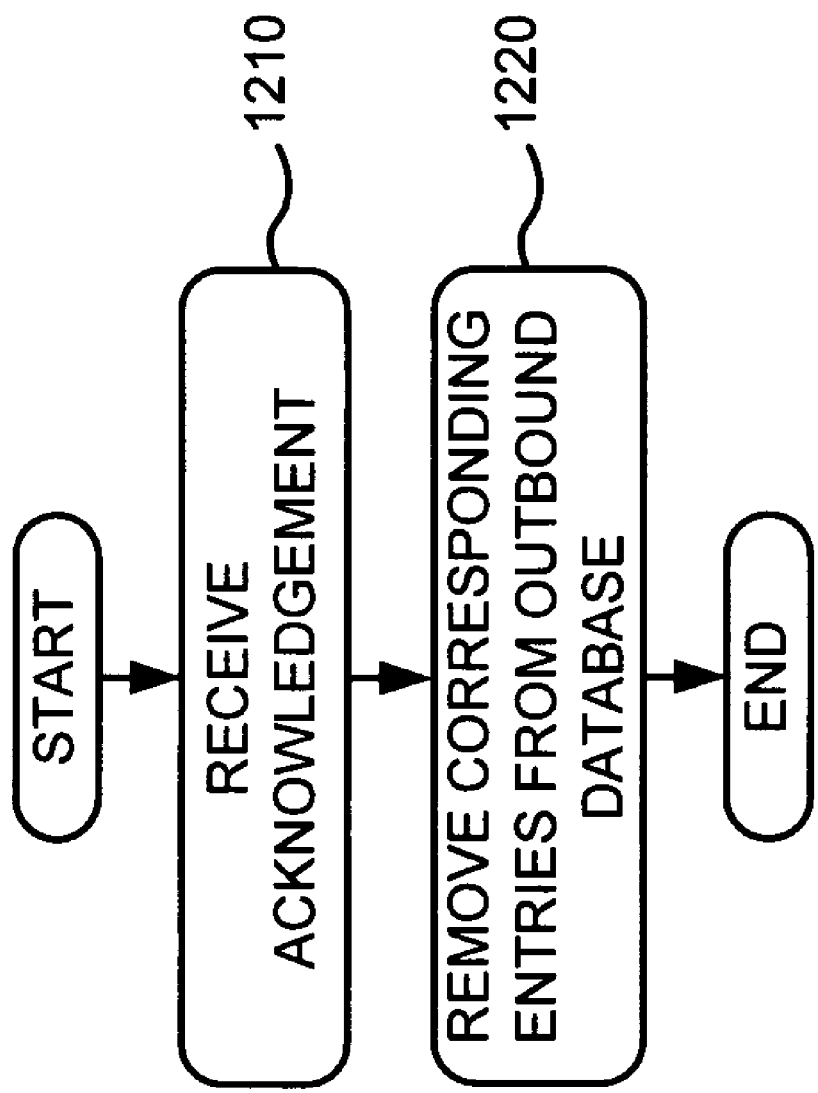
FIG. 12 is a flowchart of exemplary processing for receiving an acknowledgement message according to an implementation consistent with the principles of the invention.

FIG. 12 is a flowchart of exemplary processing for receiving an acknowledgement message according to an implementation consistent with the principles of the invention. Processing may begin with link processor 210 receiving an acknowledgement message (act 1210). The acknowledgement message may resemble the one shown in FIG. 11. Link processor 210 may then remove the entries corresponding to the packets identified as being successfully received from outbound database 326 (act 1220). For example, link processor 120 may identify the packet entries to remove based, at least in part, on the sequence numbers included in the acknowledgement message.

Figure 13:
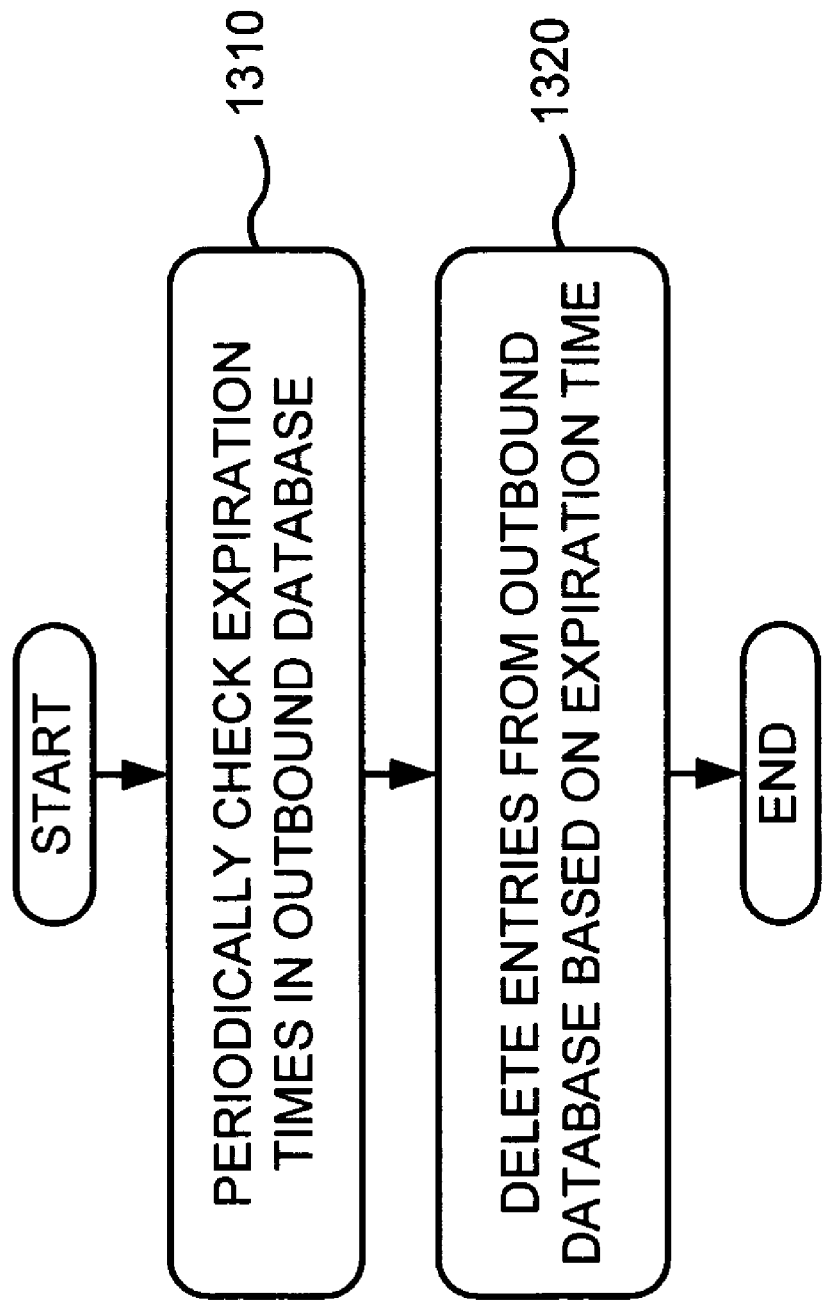
FIG. 13 is a flowchart of exemplary processing for clearing debris from the outbound database according to an implementation consistent with the principles of the invention.

FIG. 13 is a flowchart of exemplary processing for clearing debris from outbound database 326 according to an implementation consistent with the principles of the invention. The processing described below may be performed periodically if expiration timers are used. Processing may begin with link processor 120 periodically checking expiration time fields 530 (FIG. 5) in outbound database 326 (act 1310). Link processor 120 may then delete entries from outbound database 326 based on the values of their expiration fields 530 (act 1320). For example, link processor 120 may delete entries that have an expiration time prior to the current time.

Systems and methods consistent with the principles of the invention provide a hybrid link that includes a slower but more reliable link and a faster but less reliable link. A hybrid link consistent with the principles of the invention offers better performance than either of its two links by themselves. Communication over the hybrid link may include transmission over the slower but more reliable link, transmission over the faster but less reliable link, or transmission over both links.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 7A-10, 12, and 13, the order of the acts may differ in other implementations consistent with the principles of the invention. Moreover, non-dependent acts may be performed in parallel.

Further, while described in terms of packets, systems and methods consistent with the principles of the invention may operate on any type or form of data. The term "data unit" will be used to refer to all types and forms of data, including packet and non-packet data.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method for communicating between first and second nodes, comprising:
    selectively transmitting a data unit from the first node to the second node over a first link, where the selectively transmitting a data unit from the first node to the second node over a first link includes:
        determining whether the data unit requires high reliability delivery, and
        transmitting the data unit over the first link when the data unit requires high reliability delivery; and
    selectively transmitting the data unit from the first node to the second node over a second link, the first link being slower and more reliable than the second link, where the selectively transmitting the data unit from the first node to the second node over the second link includes:
        determining whether the data unit can be transmitted over the second link, and
        transmitting the data unit over the second link when the data unit does not require high reliability delivery and the data unit can be transmitted over the second link.

2. The method of claim 1, where the first link includes a radio frequency link.

3. The method of claim 2, where the second link includes an optical link.

4. The method of claim 1, where the second link experiences outages of approximately fifty milliseconds or less.

5. The method of claim 1, where the second link experiences outages of approximately one minute or more.

6. The method of claim 1, where the data unit is transmitted over both the first and second links.

7. The method of claim 1, where the determining whether the data unit can be transmitted over the second link includes determining whether there is sufficient buffer space associated with the second link to store the data unit.

8. The method of claim 1, where at least one of the first or second nodes is a sky-based node or a space-based node.

9. The method of claim 1, where the first and second nodes include nodes from a group including land-based nodes, water-based nodes, sky-based nodes, or space-based nodes.

10. The method of claim 1, further comprising:
maintaining a database that stores data for retransmitting the data unit when the data unit is not successfully transmitted from the first node to the second node.

11. The method of claim 10, where the database stores data associated with a time after which the data unit is to be retransmitted and data that indicates whether the data unit has been successfully transmitted from the first node to the second node.

12. A system for communicating between a first node and a second node, comprising:
means for selectively communicating data over a slow reliable link between the first and second nodes when the data requires high reliability delivery; and
means for selectively communicating over a fast unreliable link between the first and second nodes when the data does not require high reliability delivery.

13. A first node in communication with a second node, comprising:
a first transceiver to communicate over a first link that is slow, but reliable;
a second transceiver to communicate over a second link that is faster, but less reliable than the first link; and
a link processor to:
determine whether the data unit requires high reliability delivery;
selectively transmit a data unit to the second node via the first transceiver when the data unit requires high reliability delivery, and
selectively transmit the data unit to the second node via the second transceiver when the data unit does not require high reliability delivery.

14. The first node of claim 13, where the first link includes a radio frequency link.

15. The first node of claim 14, where the second link includes an optical link.

16. The first node of claim 13, where the second link experiences outages of approximately fifty milliseconds or less.

17. The first node of claim 13, where the second link experiences outages of approximately one minute or more.

18. The first node of claim 13, where the link processor is to transmit data unit over both the first and second links.

19. The first node of claim 13, where at least one of the first and second nodes is a sky-based node or a space-based node.

20. The first node of claim 13, where the first and second nodes include nodes from a group including land-based nodes, water-based nodes, sky-based nodes, and space-based nodes.

21. The first node of claim 13, further comprising:
a link memory to store data for retransmitting the data unit when the data unit is not successfully transmitted to the second node.

22. The first node of claim 21, where the link memory is to store data associated with a time after which the data unit is to be retransmitted and data that indicates whether the data unit has been successfully transmitted to the second node.

23. A hybrid communications link between two nodes, comprising:
a slow, reliable communications link; and
a fast, unreliable communications link, where communication between the two nodes selectively uses either the slow, reliable communications link or the fast, unreliable communications link based on reliability delivery requirements of associated data.

24. The hybrid communications link of claim 23, where the slow, reliable communications link includes a radio frequency link and the fast, unreliable communications link includes an optical link.

25. A method for communicating between first and second nodes over a slow, reliable link and a faster, less reliable link relative to the slow, reliable link, the method comprising:
determining whether a data unit requires high reliability delivery;
transmitting the data unit over the slow, reliable link when the data unit requires high reliability delivery; and
transmitting the data unit over the faster, less reliable link when the data unit does not require high reliability delivery.

26. The method of claim 25, where the faster, less reliable link includes an optical link.

27. The method of claim 26, where the slow, reliable link includes a radio frequency link.

28. A node in communication with another node, comprising:
a first transceiver to communicate over a slow, reliable link;
a second transceiver to communicate over a faster, less reliable link relative to the slow, reliable link; and
a link processor to:
determine whether a data unit requires high reliability delivery,
transmit the data unit over the slow, reliable link via the first transceiver when the data unit requires high reliability delivery, and
transmit the data unit over the faster, less reliable link via the second transceiver when the data unit does not require high reliability delivery.

29. A method, comprising:
receiving a data unit;
determining whether sufficient buffer space is associated with a first transceiver to store the data unit, where the first transceiver transmits data over a slow, reliable link;
transmitting the data unit over the slow, reliable link via the first transceiver if sufficient buffer space exists; and
transmitting the data unit over a faster, less reliable link via a second transceiver if insufficient buffer space is associated with the first transceiver.

30. The method of claim 29, where the faster, less reliable link includes an optical link and wherein the slow, reliable link includes a radio frequency link.

31. A system, comprising:
a first transceiver to communicate via a slow, reliable link;
a second transceiver to communicate via a faster, less reliable link;
a buffer coupled to the first transceiver;
a processing unit to:
receive a data unit,
determine whether the buffer has sufficient space to store the data unit,
initiate transmission of the data unit over the slow, reliable link via the first transceiver if the buffer has sufficient space, and
initiate transmission of the data unit over a faster, less reliable link via the second transceiver if the buffer has insufficient space.

32. The method of claim 31, where the faster, less reliable link includes an optical link and wherein the slow, reliable link includes a radio frequency link.

* * * * *